United States Patent
Cullimore

(10) Patent No.: US 9,436,521 B2
(45) Date of Patent: Sep. 6, 2016

(54) TCP/IP STACK-BASED OPERATING SYSTEM

(75) Inventor: Ian Henry Stuart Cullimore, Leominster (GB)

(73) Assignee: IOTA Computing, Inc., Palo Alto, CA (US)

( * ) Notice: Subject to any disclaimer, the term of this patent is extended or adjusted under 35 U.S.C. 154(b) by 113 days.

(21) Appl. No.: 12/938,290

(22) Filed: Nov. 2, 2010

(65) Prior Publication Data
US 2011/0107357 A1   May 5, 2011

(30) Foreign Application Priority Data

Nov. 3, 2009 (GB) .................................. 0919253.5
Jun. 29, 2010 (GB) .................................. 1010886.8

(51) Int. Cl.
| | |
|---|---|
| G06F 15/16 | (2006.01) |
| G06F 9/54 | (2006.01) |
| H04L 29/06 | (2006.01) |
| H04W 4/00 | (2009.01) |

(52) U.S. Cl.
CPC ............... *G06F 9/54* (2013.01); *H04L 69/161* (2013.01); *H04W 4/00* (2013.01)

(58) Field of Classification Search
USPC ........ 709/201–203, 217–238, 244–247, 250; 710/1; 712/1; 718/1
See application file for complete search history.

(56) References Cited

U.S. PATENT DOCUMENTS

| | | | |
|---|---|---|---|
| 5,469,553 A | 11/1995 | Patrick | |
| 5,493,689 A | 2/1996 | Waclawsky et al. | |
| 5,710,910 A * | 1/1998 | Kehl et al. | ............... 713/400 |
| 5,826,014 A | 10/1998 | Coley et al. | |
| 5,896,499 A | 4/1999 | McKelvey | |
| 5,968,133 A | 10/1999 | Latham et al. | |
| 6,279,113 B1 | 8/2001 | Vaidya | |
| 6,587,884 B1 | 7/2003 | Papadopoulos et al. | |

(Continued)

FOREIGN PATENT DOCUMENTS

| | | |
|---|---|---|
| CN | 1622517 | 6/2005 |
| EP | 1213892 | 6/2002 |

(Continued)

OTHER PUBLICATIONS

Hutchinson, Norman C., and Larry L. Peterson. "The x-kernel: An architecture for implementing network protocols." Software Engineering, IEEE Transactions on 17.1 (1991): 64-76.*

(Continued)

*Primary Examiner* — David Lazaro
(74) *Attorney, Agent, or Firm* — Carr & Ferrell LLP

(57) ABSTRACT

Systems and corresponding methods include a system having an operating system based wholly around a protocol stack, such as a Transmission Control Protocol/Internet Protocol (TCP/IP) stack. The system may include a central processing unit (CPU) including the operating system embedded therein, and a network interface coupled with a network and the CPU. The network may be the Internet. The operating system is fundamentally a state machine. The kernel of the operating system is fundamentally just a protocol stack for communicating with one or more devices of the network via the network interface. The protocol stack may be a TCP/IP protocol stack, UDP/IP stack or combinations thereof. A chip may be provided that includes the TCP/IP stack state machine-based operating system embedded in a CPU. The resultant chip may be ultra low power, miniscule in size, and IP-centric.

20 Claims, 8 Drawing Sheets

(56) References Cited

U.S. PATENT DOCUMENTS

| | | | |
|---|---|---|---|
| 6,714,536 B1* | 3/2004 | Dowling | 370/356 |
| 6,851,061 B1 | 2/2005 | Holland, III et al. | |
| 7,002,979 B1 | 2/2006 | Schneider et al. | |
| 7,036,064 B1 | 4/2006 | Kebichi et al. | |
| 7,055,173 B1 | 5/2006 | Chaganty et al. | |
| 7,076,803 B2 | 7/2006 | Bruton, III et al. | |
| 7,246,272 B2 | 7/2007 | Cabezas et al. | |
| 7,308,686 B1 | 12/2007 | Fotland et al. | |
| 7,328,158 B1* | 2/2008 | Burridge | 704/231 |
| 7,333,437 B1 | 2/2008 | Glick | |
| 7,334,124 B2 | 2/2008 | Pham et al. | |
| 7,363,369 B2 | 4/2008 | Banerjee et al. | |
| 7,424,710 B1 | 9/2008 | Nelson et al. | |
| 7,509,673 B2 | 3/2009 | Swander et al. | |
| 7,568,030 B2 | 7/2009 | Banerjee et al. | |
| 7,657,933 B2 | 2/2010 | Hussain et al. | |
| 7,694,158 B2 | 4/2010 | Melpignano et al. | |
| 7,734,933 B1 | 6/2010 | Marek et al. | |
| 7,770,179 B1 | 8/2010 | James-Roxby et al. | |
| 7,886,340 B2 | 2/2011 | Carley | |
| 8,055,822 B2 | 11/2011 | Bernstein et al. | |
| 8,132,001 B1 | 3/2012 | Patten et al. | |
| 8,335,864 B2 | 12/2012 | Cullimore | |
| 8,607,086 B2 | 12/2013 | Cullimore | |
| 8,875,276 B2 | 10/2014 | Cullimore et al. | |
| 8,904,214 B2 | 12/2014 | Volpe et al. | |
| 2002/0007420 A1 | 1/2002 | Eydelman et al. | |
| 2002/0010800 A1 | 1/2002 | Riley et al. | |
| 2002/0167965 A1 | 11/2002 | Beasley et al. | |
| 2003/0084190 A1* | 5/2003 | Kimball | 709/248 |
| 2003/0204639 A1* | 10/2003 | Lake | G06F 9/4881 719/310 |
| 2004/0049624 A1* | 3/2004 | Salmonsen | 710/306 |
| 2004/0093520 A1 | 5/2004 | Lee et al. | |
| 2004/0143751 A1 | 7/2004 | Peikari | |
| 2004/0210320 A1 | 10/2004 | Pandya | |
| 2004/0225805 A1* | 11/2004 | Vasudevan | 710/305 |
| 2004/0249957 A1 | 12/2004 | Ekis et al. | |
| 2005/0021712 A1 | 1/2005 | Chassapis et al. | |
| 2005/0097226 A1* | 5/2005 | Tripathi | 709/250 |
| 2005/0193137 A1 | 9/2005 | Farnham | |
| 2005/0193173 A1* | 9/2005 | Ring | G06F 21/57 711/118 |
| 2005/0240993 A1 | 10/2005 | Treadwell et al. | |
| 2005/0267930 A1 | 12/2005 | Wybenga et al. | |
| 2006/0026162 A1* | 2/2006 | Salmonsen et al. | 707/10 |
| 2006/0070122 A1 | 3/2006 | Bellovin | |
| 2006/0123123 A1 | 6/2006 | Kim et al. | |
| 2006/0133370 A1* | 6/2006 | Eldar | 370/389 |
| 2006/0251072 A1 | 11/2006 | Hendel et al. | |
| 2007/0008976 A1 | 1/2007 | Meenan | |
| 2007/0022421 A1 | 1/2007 | Lescouet et al. | |
| 2007/0118596 A1* | 5/2007 | Patiejunas | 709/203 |
| 2007/0211633 A1* | 9/2007 | Gunawardena et al. | 370/232 |
| 2007/0255861 A1 | 11/2007 | Kain et al. | |
| 2007/0294512 A1* | 12/2007 | Crutchfield | G06F 8/443 712/200 |
| 2008/0046891 A1 | 2/2008 | Sanchorawala et al. | |
| 2008/0109665 A1 | 5/2008 | Kuhlmann et al. | |
| 2008/0134330 A1 | 6/2008 | Kapoor et al. | |
| 2008/0177756 A1 | 7/2008 | Kosche et al. | |
| 2008/0271035 A1 | 10/2008 | Yasukawa | |
| 2008/0288666 A1 | 11/2008 | Hodges et al. | |
| 2009/0126003 A1 | 5/2009 | Touboul | |
| 2009/0158299 A1 | 6/2009 | Carter | |
| 2009/0217020 A1 | 8/2009 | Yourst | |
| 2009/0235263 A1 | 9/2009 | Furukawa | |
| 2009/0325615 A1 | 12/2009 | McKay et al. | |
| 2010/0005323 A1 | 1/2010 | Kuroda et al. | |
| 2010/0115116 A1 | 5/2010 | Asnaashari | |
| 2010/0131729 A1 | 5/2010 | Fulcheri et al. | |
| 2010/0185719 A1 | 7/2010 | Howard | |
| 2010/0192225 A1 | 7/2010 | Ma et al. | |
| 2011/0002184 A1 | 1/2011 | Kim | |
| 2011/0088037 A1 | 4/2011 | Glistvain | |
| 2011/0156872 A1 | 6/2011 | Wengrovitz | |
| 2012/0017262 A1 | 1/2012 | Kapoor et al. | |
| 2012/0042088 A1 | 2/2012 | Cullimore | |
| 2012/0255031 A1 | 10/2012 | Sallam | |
| 2013/0061070 A1 | 3/2013 | Cullimore | |
| 2013/0061078 A1 | 3/2013 | Cullimore | |
| 2013/0061283 A1 | 3/2013 | Cullimore et al. | |
| 2013/0061313 A1 | 3/2013 | Cullimore et al. | |

FOREIGN PATENT DOCUMENTS

| | | |
|---|---|---|
| EP | 2497003 | 9/2012 |
| EP | 2751700 | 7/2014 |
| EP | 2751701 | 7/2014 |
| EP | 1484887 | 12/2014 |
| TW | 200924424 | 6/2009 |
| WO | WO2011056808 | 5/2011 |
| WO | WO 2013/032660 | 3/2013 |
| WO | WO 2013/032661 | 3/2013 |

OTHER PUBLICATIONS

Wang, Catherine Lingxia, et al. "A survey of embedded operating system." University of California, San Diego (2001).*

Rusling, David "The Linux Kernel" Chapter 2 only, Jan. 2007, 6 pages downloaded from web.archive.org/web/20070105172636/ http://www.tldp.org/LDP/tlk/basics/sw.html.*

Anh et al. "Real-Time Operating Systems for Small Microcontrollers," IEEE Micro, Sep.-Oct. 2009. vol. 29, No. 5, p. 30-45. [Accessed Feb. 15, 2011—IEEExplore] http://ieeexplore.ieee.org/xpls/abs_all.jsp?arnumber=5325154.

Ashkenazi et al. "Platform Independent Overall Security Architecture in Multi-Processor System-on-Chip ICs for Use in Mobile Phones and Handheld Devices," World Automation Congress, Jul. 24-26, 2006. [Accessed Feb. 18, 2011—Engineering Village].

Bathen et al. "Inter and Intra Kernel Reuse Analysis Driven Pipelineing on Chip-Multiprocessors," International Symposium on VLSI Design, Automation and Test, Apr. 26-29, 2010. p. 203-207. [Accessed Feb. 16, 2011—IEEExplore] http://ieeexplore.ieee.org/xpls/abs_all.jsp?arnumber=5496725.

Bolchini et al. "Smart Card Embedded Information Systems: A Methodology for Privacy Oriented Architectural Design," Data & Knowledge Engineering, 2002. vol. 41, No. 2-3, p. 159-182. [Accessed Feb. 16, 2011—ScienceDirect.com].

Cavium Networks, "Nitrox® DPI L7 Content Processor Family," Accessed on Feb. 16, 2011 at http://www.caviumnetworks.com/processor_NITROX-DPI.html.

Cavium Networks, "Nitrox® Lite," Accessed on Feb. 16, 2011 at http://www.caviumnetworks.com/processor_security_nitroxLite.htm.

Ferrante et al. "Application-Driven Optimization of VLIW Architectures: A Hardware-Software Approach," 11th IEEE Real Time and Embedded Technology and Applications Symposium, Mar. 7-10, 2005. p. 128-137. [Accessed Feb. 15, 2011—IEEExplore] http://ieeexplore.ieee.org/xpls/abs_all.jsp?arnumber=1388380.

"IP Multimedia Subsystems," Freescale Semiconductor, 2006. (brochure) [Accessed Feb. 16, 2011] http://cache.freescale.com/files/32bit/doc/brochure/BRIMSSOLUTIONS.pdf.

Green Hills Software, "μ-velOSity™ Real-Time Microkernel," Accessed on Feb. 16, 2011 at http://www.ghs.com/products/micro_velosity.html.

"μ-velOSity Microkernel," (datasheet) Green Hills Software, Inc., 2006.

Hattori. "Challenges for Low-Power Embedded SOC's," International Symposium on VLSI Design, Automation and Test, Apr. 25-27, 2007. p. 1. [Accessed Feb. 16, 2011—IEEExplore] http://ieeexplore.ieee.org/xpls/abs_all.jsp?arnumber=4239406.

Journal of Techonology & Science, "Express Logic, Inc.; Express Logic and IAR Systems Team Up to Provide ThreadX RTOS Support in IAR Embedded Workbench IDE for Freescale ColdFire," Accessed on Feb. 16, 2011 at http://proquest.umi.com.mutex.gmu.edu/pqdweb?index=7&did=1541305 . . . .

(56) References Cited

OTHER PUBLICATIONS

Kakaountas et al. "Implementation of HSSec: A High-Speed Cryptographic Co-Processor," IEEE Conference on Emerging Technologies and Factory Automation, Sep. 25-28, 2007. p. 625-631. [Accessed Feb. 16, 2011—IEEExplore] http://ieeexplore.ieee.org/xpls/abs_all.jsp?arnumber=4416827.

Ke et al. "Design of PC/104 Processor Module Based on ARM," International Conference on Electrical and Control Engineering, Jun. 25-27, 2010. p. 775-777. [Accessed Feb. 17, 2011—IEEExplore] http://ieeexplore.ieee.org/xpls/abs_all.jsp?arnumber=5630566.

Kinebuchi et al. "A Hardware Abstraction Layer for Integrating Real-Time and General-Purpose with Minimal Kernel Modification," Software Technologies for Future Dependable Distributed Systems, Mar. 17, 2009. p. 112-116. [Accessed Feb. 16, 2011—IEEExplore] http://ieeexplore.ieee.org/xpls/abs_all.jsp?arnumber=4804582.

Tabari, et al. "Neural Network Processor for a FPGA-based Multiband Fluorometer Device," International Workshop on Computer Architecture for Machine Perception and Sensing, Aug. 18-20, 2006. p. 198-202. [Accessed Feb. 16, 2011—IEEExplore] http://ieeexplore.ieee.org/xpls/abs_all.jsp?arnumber=4350381.

Wang et al. "Towards High-Performance Network Intrusion Prevention System on Multi-core Network Services Processor," 15th International Conference on Parallel and Distributed Systems, Dec. 8-11, 2009. p. 220-227. [Accessed Feb. 16, 2011—IEEExplore].

Wong, William, "16-Bit MCU Invades 8-Bit Territory with 4- by 4-mm Chip," Electronic Design, Sep. 29, 2005. vol. 53, No. 21, p. 32. [Accessed Feb. 16, 2011—Academic Search Complete].

"Yoggie Pico Personal Security Appliance," www.yoggie.com. (archived on May 31, 2009) [Accessed Feb. 16, 2011—Archive.org].

"Yoggie Security Unveils Miniature Hardware Appliance," www.yoggie.com. (archived on May 31, 2009) [Accessed Feb. 16, 2011—Archive.org].

"Yoggie Unveils Miniature Internet Security Devices for Mac Computers," M2 Telecomworldwire,Oct. 14, 2008. [Accessed Feb. 18, 2011—Academic Source Complete].

Office Action, Oct. 2, 2013, U.S. Appl. No. 13/224,938, filed Sep. 2, 2011.

Office Action, Feb. 22, 2012, U.S. Appl. No. 13/225,233, filed Sep. 2, 2011.

Office Action, Oct. 25, 2012, U.S. Appl. No. 13/225,233, filed Sep. 2, 2011.

Final Office Action, Jun. 11, 2013, U.S. Appl. No. 13/225,233, filed Sep. 2, 2011.

Notice of Allowance, Sep. 7, 2012, U.S. Appl. No. 13/277,111, filed Oct. 19, 2011.

Office Action, Mar. 8, 2012, U.S. Appl. No. 13/333,802, filed Dec. 21, 2011.

Office Action, Aug. 14, 2012, U.S. Appl. No. 13/333,802, filed Dec. 21, 2011.

Final Office Action, Jan. 24, 2013, U.S. Appl. No. 13/333,802, filed Dec. 21, 2011.

Notice of Allowance, Jun. 11, 2013, U.S. Appl. No. 13/333,802, filed Jun. 11, 2013.

Office Action, Feb. 22, 2012, U.S. Appl. No. 13/333,824, filed Dec. 21, 2011.

Office Action, Aug. 9, 2012, U.S. Appl. No. 13/333,824, filed Dec. 21, 2011.

Final Office Action, Jan. 7, 2013, U.S. Appl. No. 13/333,824, filed Dec. 21, 2011.

International Search Report and Written Opinion mailed Sep. 12, 2012 in Patent Cooperation Treaty application No. PCT/US12/50107, filed Aug. 9, 2012.

International Search Report and Written Opinion mailed Oct. 16, 2012 in Patent Cooperation Treaty application No. PCT/US12/50101, filed Aug. 9, 2012.

Mukherjee. "A Runtime Framework for Parallel Programs" [Online]. Dated Aug. 16, 2006. Retrieved on Sep. 24, 2012. Retrieved from the internet at URL: <http://citeseerx.ist.psu.edu/viewdoc/download?doi=10.1.122.6849&rep=rep1&type=pdf>, entire document, especially p. III.

Jiang Min. "A design of embedded terminal unit based on ARM and Windowa CE", ICEMI, 8th International Conference on Electronic Measurement and Instruments, 2007, pp. 2-336 to 2-340.

Wang et al. "A survey of embedded operating system", 2001, ceit.aut.ac.ir.

LINFO: "Embedded system definition", Linux Information Project, 2006.

Extended European Search Report mailed Apr. 3, 2013 in European Patent application No. 10828991.9, filed Nov. 2, 2010.

Antoniou, S. "Networking Basics: TCP, UDP, TCP/IP and OSI Model," Oct. 29, 2007, <www.translingal.com/blog/networking-basics-tco=udp-tcpip-osi-models> (retrieved Jun. 4, 2013) 8 pages.

Notice of Allowance, Aug. 5, 2014, U.S. Appl. No. 13/224,938, filed Sep. 2, 2011.

Notice of Allowance, Sep. 8, 2014, U.S. Appl. No. 13/225,233, filed Sep. 2, 2011.

Non-Final Office Action, Jun. 12, 2014, U.S. Appl. No. 13/333,824, filed Dec. 21, 2011.

Final Office Action, Jan. 5, 2015, U.S. Appl. No. 13/333,824, filed Dec. 21, 2011.

Non-Final Office Action, Jul. 27, 2015, U.S. Appl. No. 13/333,824, filed Dec. 21, 2011.

Dunkels et al. "Contiki: a Lightweight and Flexible Operating System for Tiny Networked Sensors", 29th Annual IEEE International Conference on Local Computer Networks, 2004, 8 pages.

Haldar and Aravind. "Operating Systems", Pearson India, 2009, 612 pages.

Extended European Search Report mailed Jan. 23, 2015 in European Patent application No. 12827760.5, filed Aug. 9, 2012.

Mills: "Kernel timekeeping support", Dec. 31, 2006, Computer Network Time Synchronization The Network Time Protocol, pp. 125-144 <http://www.crcnetbase.com/doi/abs/10.1201/9781420006155.ch8> (retrieved Jan. 14, 2015).

Extended European Search Report mailed Mar. 25, 2015 in European Patent application No. 12828083.1, filed Aug. 9, 2012.

\* cited by examiner

TCP/IP STACK-BASED OPERATING SYSTEM

CROSS REFERENCES TO RELATED APPLICATIONS

This nonprovisional patent application claims priority to U.K. Application No. 0919253.5, filed Nov. 3, 2009, titled: "A New Architecture for Software and Hardware Design in Miniscule Microprocessor Systems" and to U.K. Application No. 1010886.8, filed Jun. 29, 2010, titled: "A New Architecture for Software and Hardware Design in Miniscule Microprocessor Systems, for Internet Connected Devices", which are hereby incorporated by reference in their entirety.

FIELD OF THE INVENTION

The present invention is generally related to computing systems, and more particularly, to a protocol stack-based computing system.

BACKGROUND

Conventional computing devices (such as a desktop, laptop) or a "smart" mobile phone (such as an Apple iPhone® or Nokia E71®), run an operating system. Conventional operating systems include Microsoft Windows®, Apple OS X®, Symbian®, or Linux®, and are quite similar in architecture, in that each tends to have conventional file and memory management operations, storage and graphical user interface operations, and so forth.

Such conventional operating systems are old-fashioned in their fundamental design, in as much as their core kernels date from architectures and implementations generally several decades old. For instance, the Apple OS X and Linux operating systems are each based on the Unix operating system which was developed in the 1970s. Similarly, Microsoft's Windows operating system has its roots strongly in MS-DOS operating system, itself from the 1970s. Typically, these and other conventional operating systems follow very similar architectures, including a layered design, device drivers, and Application Programming Interfaces (APIs). The executable instructions for these conventional operating systems are all typically coded in high-level languages, such as 'C' and C++.

In a "conventional" operating system, a core kernel "executive" has essentially master control over all the operation of the overlying software (other systems components, device drivers, applications, etc.). Typically, the executive allocates timeslices of processor execution time on a pre-emptive priority basis in threads and processes. That is, the executive deterministically gives, in turn, registered applications or processes a piece of the action. Ironically, most of the time nothing is being done at all. For the Microsoft Windows operating system, for example, if nothing much is going on, the System Monitor may show that the System Idle Process is using 98% of the available microprocessor time or clock cycles.

Conventional microprocessor designs use a fixed-frequency, continuously running crystal as the timing mechanism for clocking through microprocessor execution cycles. Thus, the crystal and the microprocessor continue running even if nothing much is being accomplished in the system, uselessly cycling around and waiting for a process to actually perform a action (e.g., process an incoming TCP/IP packet on the Ethernet interface or perform a calculation in a spreadsheet). This timing paradigm is energy-wasteful in two respects. First, the crystal and microprocessor transistors are typically executing at their maximum speed at all times, thereby consuming excess power and generating excess heat. Secondly, it is very inefficient to continue running clock cycles if no substantive process is actually running. However, the conventional operating system design forces this inefficiency when using, for instance, a conventional "multitasking," pre-emptive prioritized operating system, such as Windows®, OS X® or Linux®.

Furthermore, the conventional operating system kernel executive must assume a hostile environment where it must handle badly written or even malicious applications which may hang, crash, or try to take control of the system. Consequently, the operating system must be constantly vigilant.

Moreover, such conventional operating systems require various modifications and enhancements year by year, to cater to new requirements and technologies. Such enhancements are typically accomplished by "bolting on" a new layer of functionality.

For instance, the rapid rise of the Internet in recent years has made it necessary to bolt on many new components, such as the communications layers of Ethernet drivers, TCP/IP stacks, and Web browsers. Generally, these are inelegant additions to the conventional operating system, often leading to poor performance, software crashes, and security flaws.

SUMMARY OF THE INVENTION

In accordance with various embodiments of the present invention, a computing system is provided that includes an operating system of an entirely new architecture. The operating system may be based fundamentally around the TCP/IP stack. Rather than "bolting on" a TCP/IP stack onto a conventional core operating system, the TCP/IP stack is the operating system in various embodiments. All functions run through the conventional interface, or similar extensions of, the standard Berkeley Sockets (or WinSock) Application Programming Interface (API).

In addition to the conventional Sockets APIs, such as socket( ), connect( ), listen( ) and so forth, all other functions of the operating system and associated applications may occur around the fundamental core of the TCP/IP stack.

According to various embodiments, the entire operating system of the enhanced TCP/IP stack is a state machine. Instead of including conventional operating system multitasking structures, such as threads, processes, and semaphores, etc., the operating system is an amalgam of co-operating state machine oriented components.

One of the advantages of such a computing system is that it is inherently and fundamentally Internet-oriented. All Internet type functionality is natural and inherent in the computing system design and implementation, i.e., not just bolted on as an afterthought.

The operating system may be written in low-level Assembler, rather than a high-level language such as 'C' or C++. The use of Assembly language has the advantage of much reduced code size, faster execution time, less microprocessor clock cycles, and therefore less power cycles of the microprocessor. The microprocessor, in which the operating system may be embedded, may therefore have much lower power consumption than in conventional designs.

According to various embodiments, executable instructions (code) and data for the operating system are stored separately. Thus, the read-only executable instructions may be executed directly from read only memory (ROM), and only the read/write data needs to be saved in some type of random access memory (RAM). As a result, there are both substantial power and cost savings.

The code of the operating system may thus be implemented in the actual microcode of the microprocessor or microcontroller system. In some embodiments, the code is implemented as a hardwired microcontroller system. As used herein, the term "central processing unit" or "CPU" encompasses any one of a microprocessor, microprocessor system, microcontroller, and microcontroller system.

The assembled and linked code of the operating system may be highly optimized for low power consumption, as well as reduced ROM and RAM size. Conventional computing systems utilize a conventional general-purpose microcontroller or microprocessor architecture and a general purpose operating system design. Such designs tend to optimize more commonly used opcode instructions into fewer bytes. Less-commonly used opcodes take more bytes and therefore more energy and clock cycles. According to various embodiments, an assembler/linker code generator analyzes the actual implementation-specific usage of opcode instructions and dynamically creates an optimized opcode instruction set to minimize energy clock cycle usage.

In some embodiments, the microprocessor design mask may be optimized for binary 1's and 0's, depending on whether a majority of 1's or 0's may produce a lower overall power consumption.

In addition, the overall design of TCP/IP stack-based operating system is inherently secure in the Internet environment, as it is fundamentally architected around Internet principles, and therefore not prone to security flaws inherent in bolted on afterthought implementations.

Embodiments may provide a method including receiving, by an operating system, input/output (I/O) requests from an application residing in an application layer of a system, the operating system being a state machine that comprises a protocol stack for processing the I/O requests according to a network protocol, the operating system being embedded within and executing within a central processing unit (CPU), and processing the I/O requests from the application according to the network protocol using the operating system.

Further embodiments include computing systems including a network interface coupled with a network and a central processing unit (CPU), and the central processing unit including an operating system (OS) embedded therein, the operating system being a state machine and including a kernel, the kernel comprising a protocol stack for communicating with one or more devices of the network via the network interface.

Embodiments may also include a chip having a central processing unit (CPU), and an operating system embedded in the CPU, the operating system comprising a kernel, the operating system kernel being a state machine and comprising a TCP/IP protocol stack for communicating with one or more devices via a network interface.

Embodiments may yet further include computer-readable storage media, having embodied thereon programs for executing one or more exemplary methods according to the present invention.

BRIEF DESCRIPTION OF THE DRAWINGS

All the figures provided herein are exemplary only. Also, like numbered elements in figures refer to like elements.

DETAILED DESCRIPTION

Embodiments provide systems and corresponding methods providing an operating system based wholly around a protocol stack, such as a Transmission Control Protocol/Internet Protocol (TCP/IP) stack. The system may include a central processing unit (CPU) including an operating system embedded therein, and a network interface coupled with a network and the CPU. The network may be the Internet. The operating system is fundamentally a state machine. The kernel of the operating system is fundamentally just a protocol stack for communicating with one or more devices of the network via the network interface. The protocol stack may be, but is not limited to, a TCP/IP protocol stack, UDP/IP stack, combinations thereof, or other protocols. A chip may be provided that includes the TCP/IP stack state machine based operating system embedded in a CPU.

Among the many advantages provided by various embodiments of the present invention are a small hardware design, very compact and efficient software, minimal clock cycles for execution, a natural Internet connectivity model, and extremely low power consumption.

Figure 1:
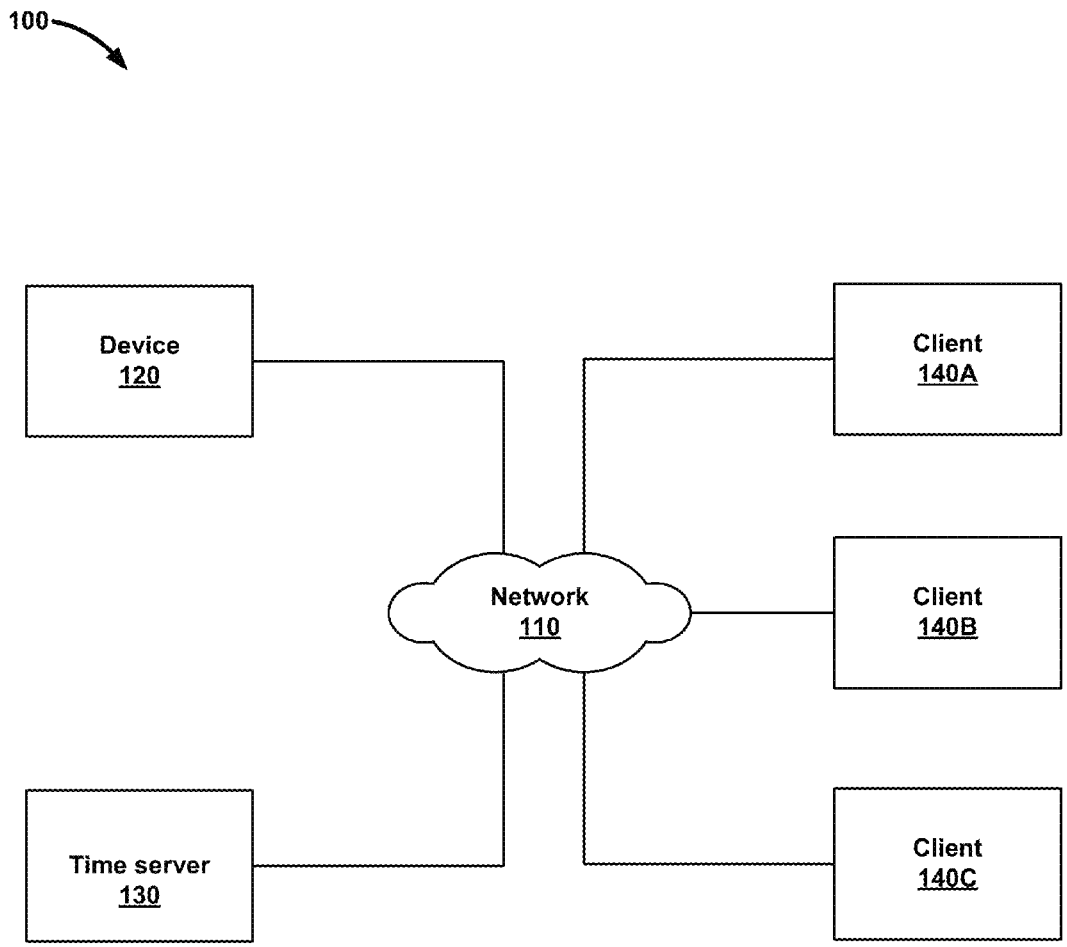
FIG. 1 is a diagram of an exemplary computing environment in which an exemplary system having a TCP/IP stack-based operating system may be practiced.

FIG. 1 is a diagram of an exemplary computing environment 100 in which an exemplary system having a TCP/IP stack-based operating system may be practiced. The environment 100 comprises a computing network 110, a device 120, an optional time server 130, and clients 140A-C. Though three clients 140A-C are shown in FIG. 1, any number of clients may be used to practice the invention. The device 120, the time server 130, and clients 140A-C may each comprise one or more computing devices. A computing device may include a desktop computer, a laptop computer, a server, a handheld computer, a smartphone, a personal digital assistant, etc.

Network 110 may be a local, proprietary network (e.g., intranet) and/or may be a part of a larger wide-area network. For example, the network 110 may be a local area network (LAN), which may also be communicatively coupled to a wide area network (WAN), such as the Internet. Network 110 allows for communication between the various components of environment 100.

The device 120 may communicate with one or more client devices 140A-C over network 110. Clients 140A-C may be devices (described in further detail with respect to FIG. 2 and FIG. 7) that include the TCP/IP stack state machine operating system. Clients 140A-C may each be a chip, each having the TCP/IP stack state machine operating system embedded in a CPU and communicating with network 110 either wired or wirelessly via a network interface. The device 120 may be a computing device (described in further detail with respect to FIG. 8) having a browser for communicating with the clients 140A-C over the network to get status or send commands. For example, the clients 140A-C may each be a light bulb, for example, each having a chip having the TCP/IP stack state machine operating system embedded in a CPU. The ultra low power and miniscule size of the chips resulting from the present design provide that and countless other application possibilities.

Figure 4A:
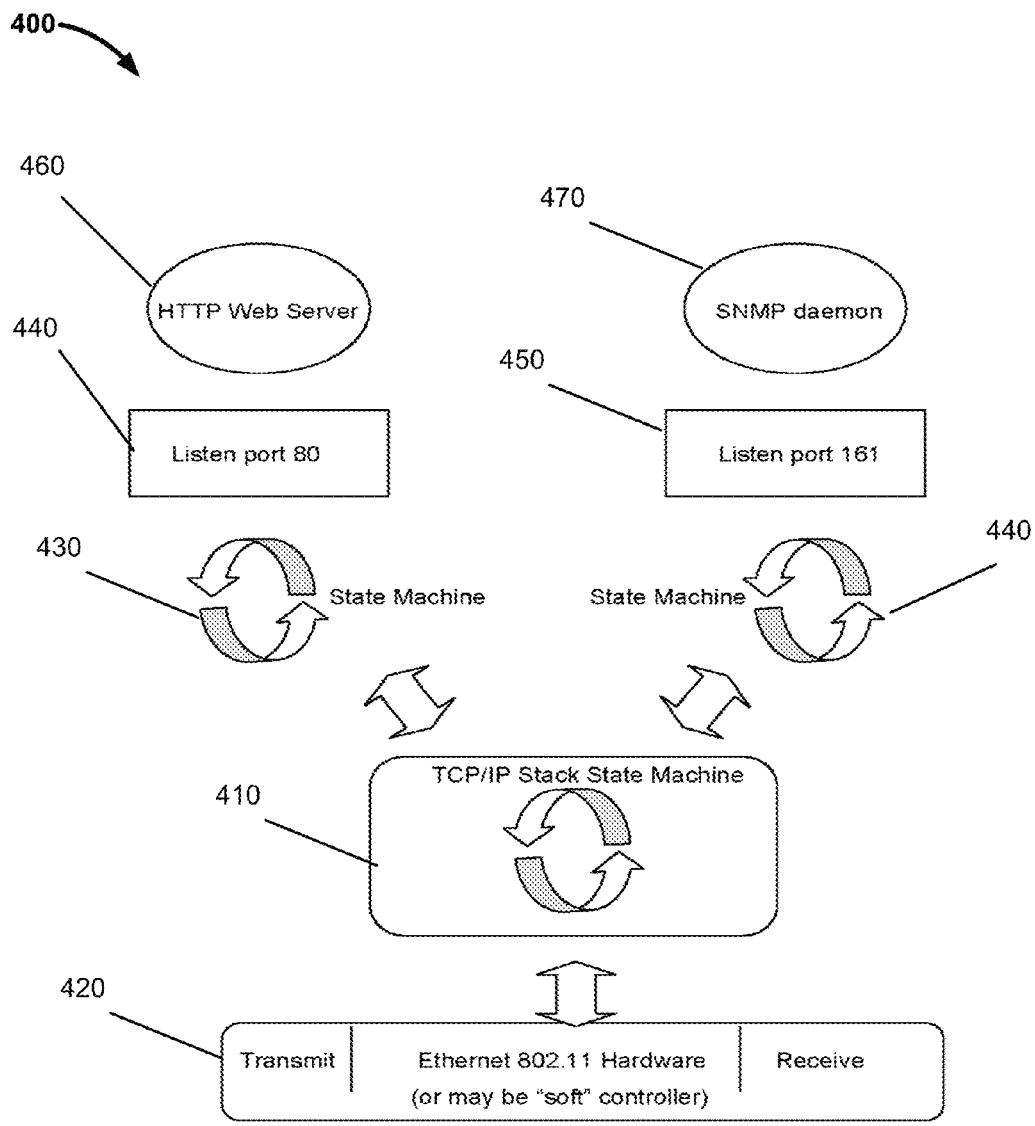
FIG. 4A is a diagram illustrating an exemplary system that includes a TCP/IP stack state machine-based system, with a web server and SNMP daemon.
Figure 4:
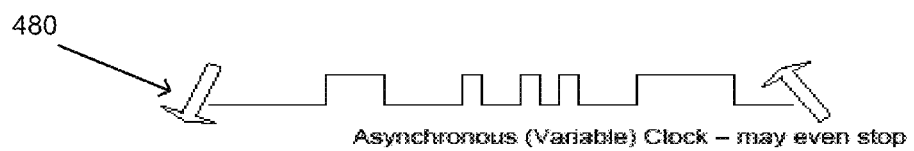
FIG. 4B is a timing diagram illustrating timing for an asynchronous clock for various aspects of FIG. 4A.

The device 120 may be a HTTP web server or Simple Network Management Protocol (SNMP) daemon described in further detail with respect to FIG. 4A. Alternatively, the device 120 may be a device described in further detail with respect to FIG. 2 that includes the TCP/IP stack state machine operating system.

The operating system kernel does not require an accurate internal clock source since it may get a time reference using the Simple Network Time Protocol (SNTP) from a remote time server, e.g., time server 130.

Device 120 and time server 130 may comprise any combination of computer hardware and software configured to receive and transmit information over the network 110, thereby communicating with the clients 140 A-C.

Figure 2:
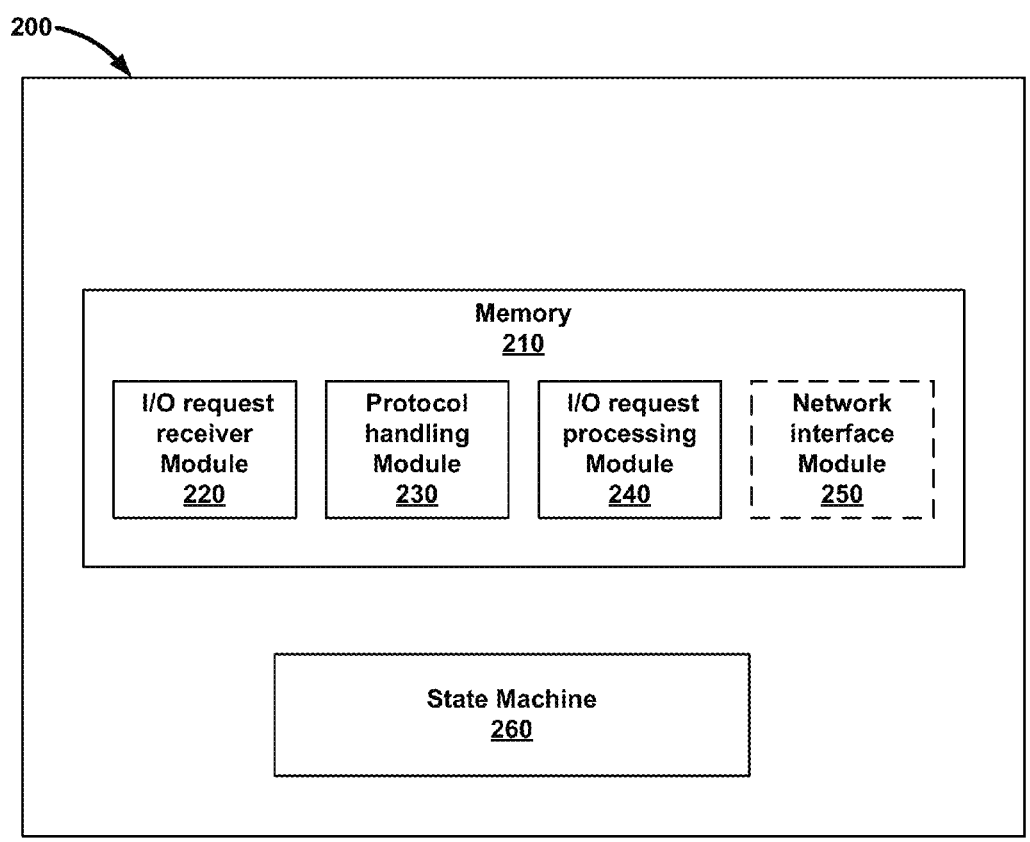
FIG. 2 is a block diagram of an exemplary TCP/IP stack-based element.

FIG. 2 is a block diagram of an exemplary TCP/IP stack-based element 200. The element 200 may be a chip into which a TCP/IP stack based operating system is embedded, for example. The element 200 may include a memory 210, which may store one or more modules. Exemplary modules which may be stored in the memory 210 include an I/O request receiver module 220, a protocol handling module 230, an I/O request processing module 240, and an optional network interface module 250. It will be appreciated by one skilled in the art that the technology described herein encompasses those embodiments where one or more of the modules may be combined with each other or not included in the memory 210 at all.

The element 200 may further include a state machine 260 for executing various instructions and modules stored in memory 210. The state machine 260 may include one or more state machines as shown and described in further detail with respect to FIGS. 4A and 7.

A module should be generally understood as one or more routines that perform various system-level functions and may be dynamically loaded and unloaded by hardware and device drivers as required. The modular software components described herein may also be integrated as part of an application specific component.

According to various embodiments, the modules may each include executable instructions for the operating system embedded into element 200 and may be executed through a sockets applications programming interface (API).

The I/O request receiver module 220 is configured to receive input/output (I/O) requests. The requests may be from an application residing in an application layer of a system as described in further detail with respect to FIG. 6.

The protocol handling module 230 is configured to handle a specific protocol for the protocol stack state machine implementation. The protocol may be a Transmission Control Protocol/Internet Protocol (TCP/IP) stack such that the operating system is a TCP/IP stack state machine. In some embodiments, the protocol stack includes a different protocol stack, e.g., a User Datagram Protocol/Internet Protocol (UDP/IP) stack, which may be used in addition to or in place of the TCP/IP stack.

As will be described in greater detail later herein, the network 110 in FIG. 1 comprises the Internet and the operating system utilizes sockets style API of sockets and ports on IP addresses for handling I/O requests. The I/O request processing module 240 is configured to process the I/O requests from an application according to the network protocol using the operating system.

The optional network interface module 250 may be included and is configured to provide an interface between the protocol stack state machine and a network interface. The corresponding network interface may be a hardware or a "soft" Ethernet controller as described in further detail with respect to FIG. 4A. Alternatively, the corresponding network interface hardware may be a wireless interface, including, but not limited to, an 802.11 based interface, ZigBee, or Bluetooth, etc.

Figure 3:
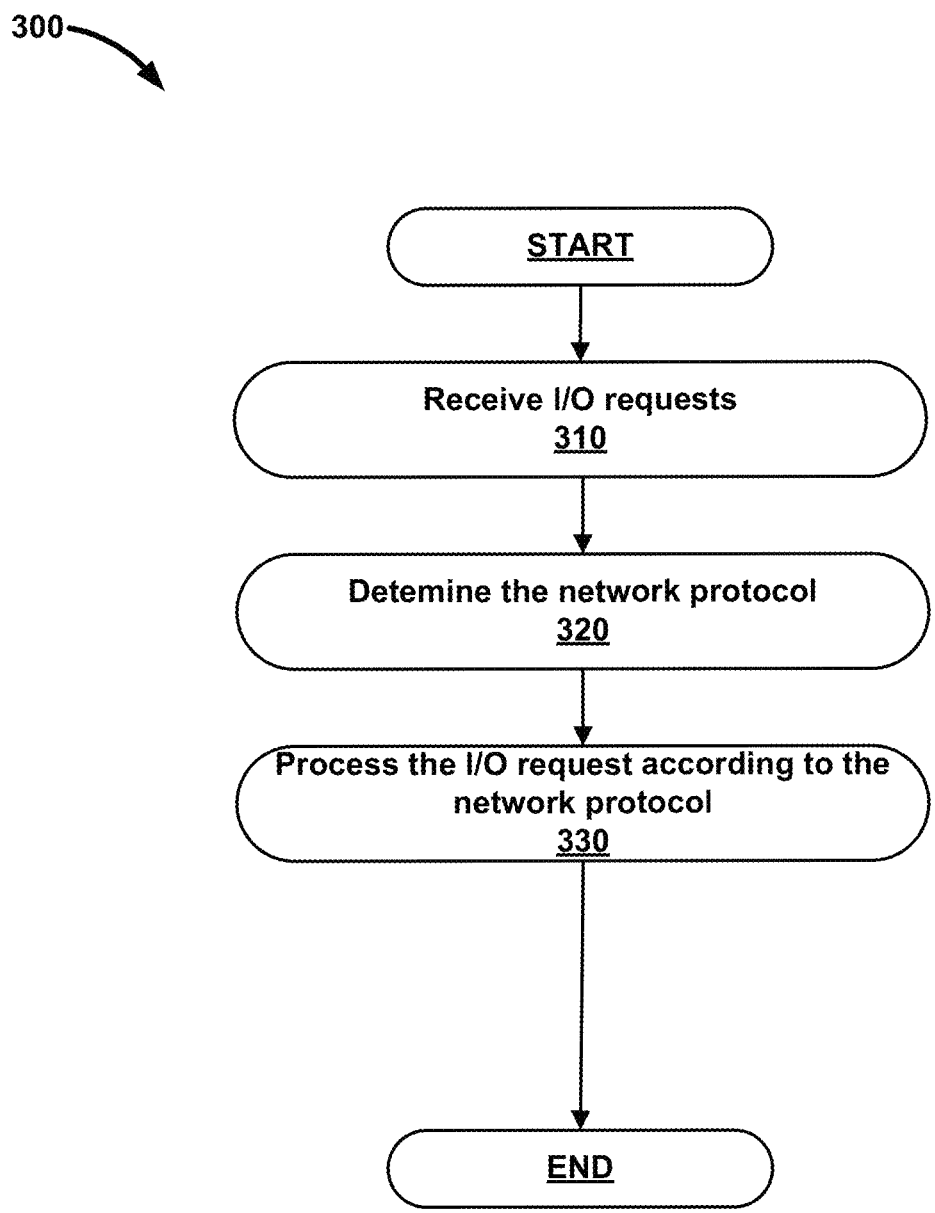
FIG. 3 is a flow chart illustrating an exemplary method for a system having a TCP/IP stack-based operating system.

FIG. 3 is a flow chart illustrating an exemplary method 300 for a system having a TCP/IP stack-based operating system. The operating system utilizes sockets style API of sockets and ports on IP addresses for handling I/O requests.

In step 310, an I/O request is received. The request may be from an application residing in an application layer of a system.

In step 320, the network protocol is determined. According to various embodiments, the protocol is TCP/IP, such that the operating system is a TCP/IP stack state machine. In some embodiments, the protocol is UDP/IP. UDP is an unreliable connectionless protocol sitting on top of IP, and TCP is a connection-oriented reliable protocol. The protocol may be a hybrid of TCP and UDP wherein a data connection stream includes a mixture of UDP and TCP packets. UDP has less overhead and is suitable for lower-importance information than TCP, which has a higher overhead but essentially guarantees reception. For instance, a stream of data comprising non-essential information (such as low-importance data) mixed with critical data could better be transmitted over such a hybrid link. This hybrid protocol may be determined in step 320.

In step 330, the I/O request is processed according to the network protocol. The processing may be performed by the state machine that fundamentally is the operating system, e.g., a TCP/IP stack state machine operating system. The operating system utilizes sockets style API of sockets and ports on IP addresses for handling I/O requests. The conventional Berkeley Sockets style API of sockets and ports on IP addresses may be used. The Berkeley sockets specify the data structures and function calls that interact with the network subsystem of the operating system.

FIG. 4A is a diagram illustrating an exemplary system 400 that includes a TCP/IP stack state machine 410, with an HTTP web server 460 and an SNMP daemon 470. The TCP/IP stack state machine 410 is fundamentally the operating system kernel and may embedded in a core CPU. The system 400 includes the TCP/IP stack state machine 410 and an Ethernet 802.11 hardware 420. The Ethernet controller 420 may provide a network interface, for example, to the Internet. In some embodiments, the Ethernet controller may be a software-based controller. The exemplary system 400 also includes the HTTP web server 460, the SNMP daemon 470, a listen port 80 identified as 440, and a listen port 161 identified as 450. The HTTP web server 460 and SNMP daemon 470 may be devices as described in further detail with respect to FIG. 8. Additional state machines (e.g., state machine 430 and state machine 440) may be included for each corresponding listen port. A state machine manager component may be included to tie the various state machines together.

Conventional microprocessors run on fixed frequency clocks driven by a crystal which runs all the time. In contrast, according to various embodiments, an asynchronous (variable) clock may serve as an internal clock for the operating system for the system 400. FIG. 4B is a timing diagram illustrating timing for an asynchronous clock for various aspects of FIG. 4A.

The asynchronous clock is configurable to automatically stop when clock cycles are not needed. As illustrated in FIG. 4A, cooperative components cycle in turn around their state machine cycles until they are all in a state of rest, at which point the internal clock can stop. As shown at 480 in FIG. 4B, the asynchronous system clock may be restarted by a wake-up "daemon" signal from the SNMP daemon, e.g. an incoming data packet. The system 400 illustrates that there is no point going round an endless idle loop if there is no action is needed.

The executable instructions may be optimized to be much tighter and more efficient than conventional systems, so much lower clock rates may be used. A self-adjusting cycle rate may be provided depending on load and function to be performed. In addition, self-learning or pre-predicted algorithms for expected scenarios may be utilized to put the CPU into a 'doze' mode of fractional Hz. Any expected external event may cause the CPU to exit the doze mode, resume full speed operation to execute necessary operations to handle the external event, and return back to doze. In a doze or a deep sleep mode, the CPU register contents may be read and stored in special registers with very long deep-sleep data maintaining capabilities. Such clock saving measures yield substantial power savings.

In some embodiments, no conventional crystal is used. The operating system kernel does not require an accurate internal clock source since it may get a time reference using the Simple Network Time Protocol (SNTP) from a remote time server coupled to the network, see e.g., time server 130 in FIG. 1

Figure 5:
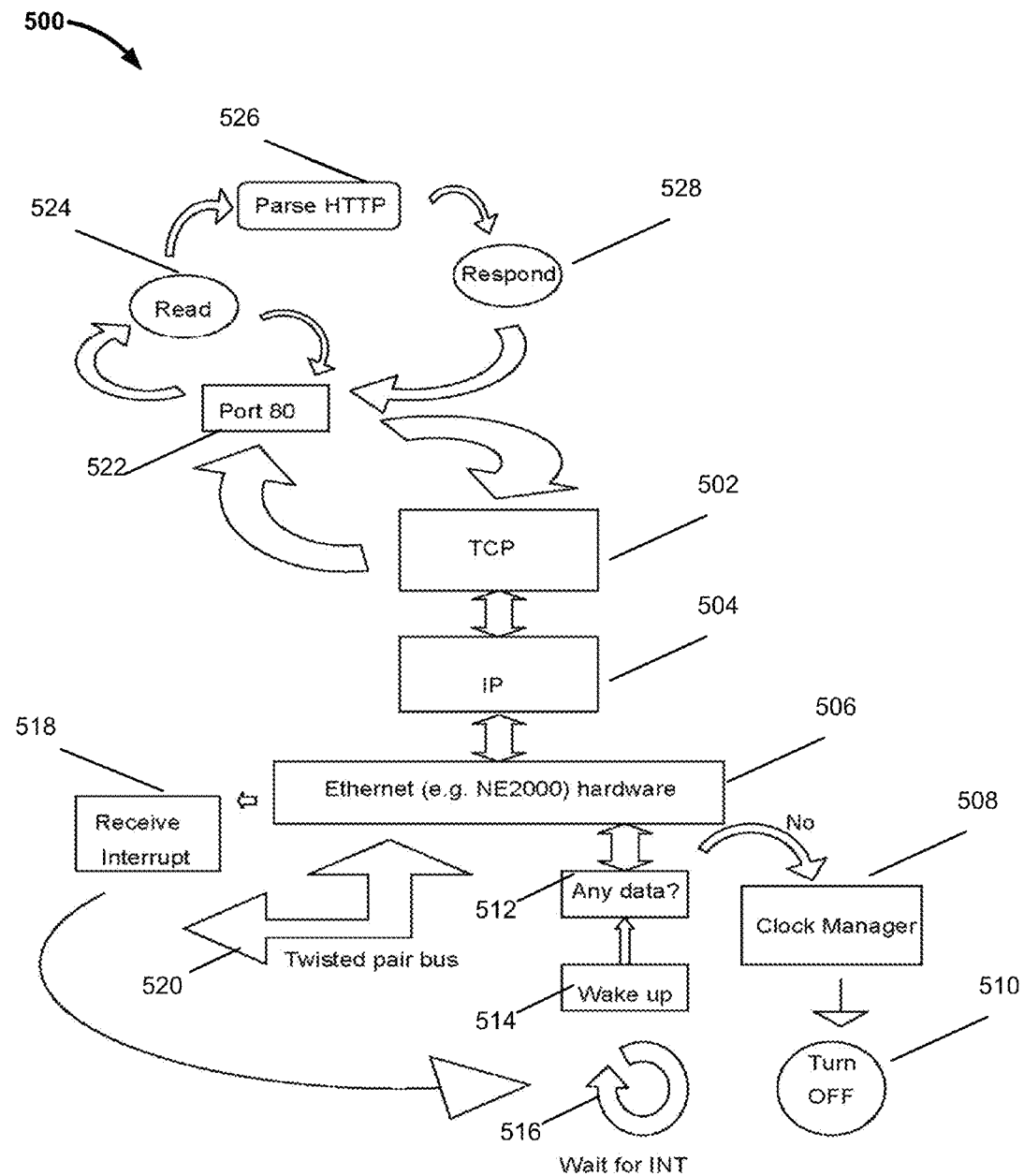
FIG. 5 illustrates an exemplary TCP/IP stack state machine-based system implemented as an HTTP web server and the operation thereof.

FIG. 5 illustrates an exemplary TCP/IP stack state machine-based system 500 implemented as an HTTP web server and operation thereof. The system includes the TCP 502 on top of IP 504 on top of Ethernet (e.g., NE2000) hardware 506. The system also may include a twisted pair bus 520 coupled to the Ethernet hardware 506. A clock manager 508 may also be included.

In operation, the system 500 may function as a simple web server comprising a TCP/IP state machine for handling the lower operation of receiving Ethernet packets up through the TCP/IP stack, and responding to HTTP requests. The system as web server would open a port on a socket on an IP address (e.g., port 80 identified at 522), and listen on that port. Port data is read at 524, the HTTP requests are parsed at 526, and responses are sent from a respond block 528.

When no tasks need to be done, the state machine is idle. The clock manager 508 causes a turn off state 510 based on a determination at 512 that there is no data to process. An asynchronous system clock may be restarted by a wake-up "daemon" signal 514 received after a wait for interrupt state 516. The receive interrupt block 518 sends the interrupt to the wait for interrupt state 516 in response to receiving data.

Figure 6:
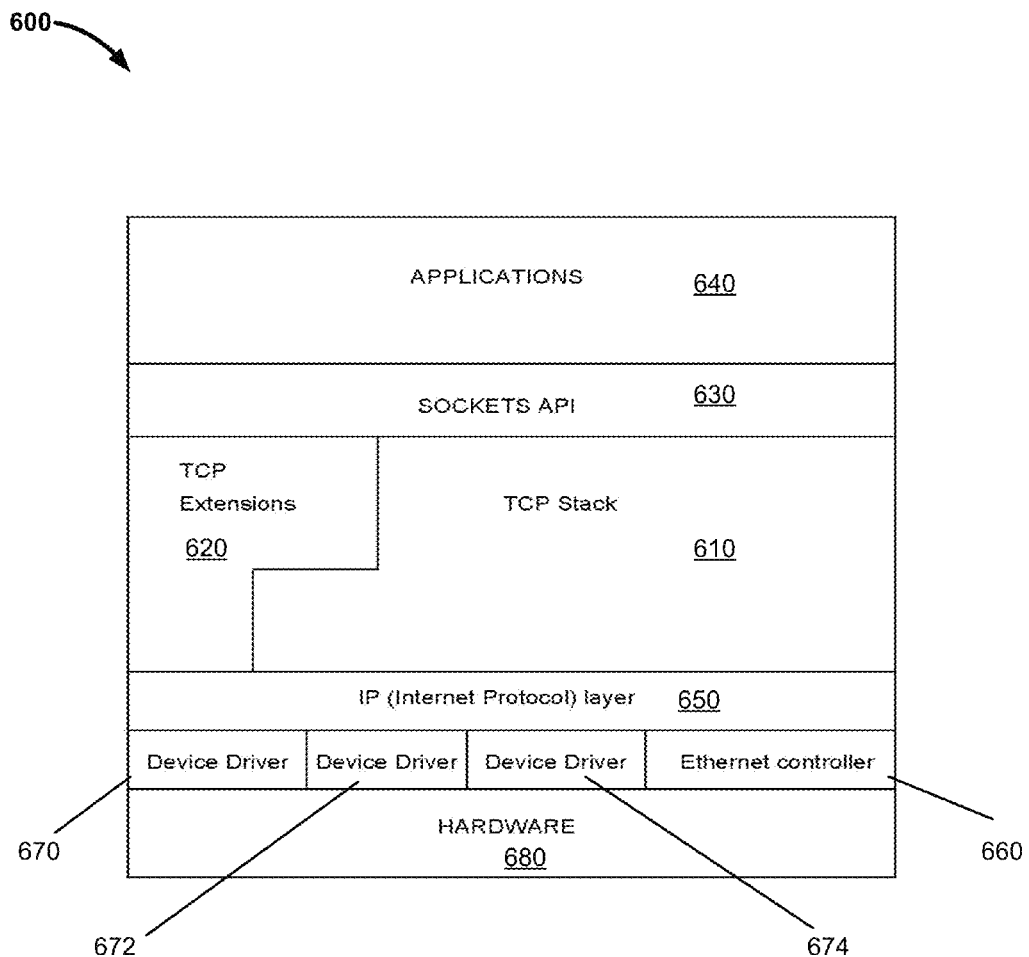
FIG. 6 depicts an exemplary architecture for a TCP/IP stack state machine-based system according to various embodiments.

FIG. 6 depicts an exemplary architecture 600 for a TCP/IP stack state machine-based system according to various embodiments. The operating system kernel architecturally includes the portion of the system between applications 640 and hardware 680 and operates between applications 640 and hardware 680. The kernel fundamentally includes a TCP/IP stack which the whole operating environment is built around. The kernel may include TCP extensions 620 which, together with the TCP stack 610, is above an IP (Internet Protocol) layer 650. The kernel may include one or more device drivers 670, 672, and 674, as well as an Ethernet controller 660.

The fundamental application programming interface (API) for all operations of the operating system may be the conventional Berkeley Sockets style API of sockets and ports on IP addresses. The Berkeley sockets specify the data structures and function calls that interact with the network subsystem of the operating system. The kernel handles all the normal Sockets APIs. The sockets API 630 may also include some optimized APIs.

Any non-conventional functions, outside the normal Internet ones, are handled in exactly the same manner, e.g., by opening sockets and binding to ports. Thus, the accessing of local input and output (e.g., keyboards, mice, and display screens) may all be accomplished through socket/port operations. Consequently, it is quite transparent as to whether a device is local or remote—a keyboard could be on a localhost at 127.0.0.1, for example, or remote on another IP address. Though this transparency may be an aspect of other operating systems, it is generally not fundamentally inherent in the operating system design from the outset. Accordingly, the "naked" kernel can be tiny in a minimal configuration, perhaps as small as just a few hundred bytes in size.

Figure 7:
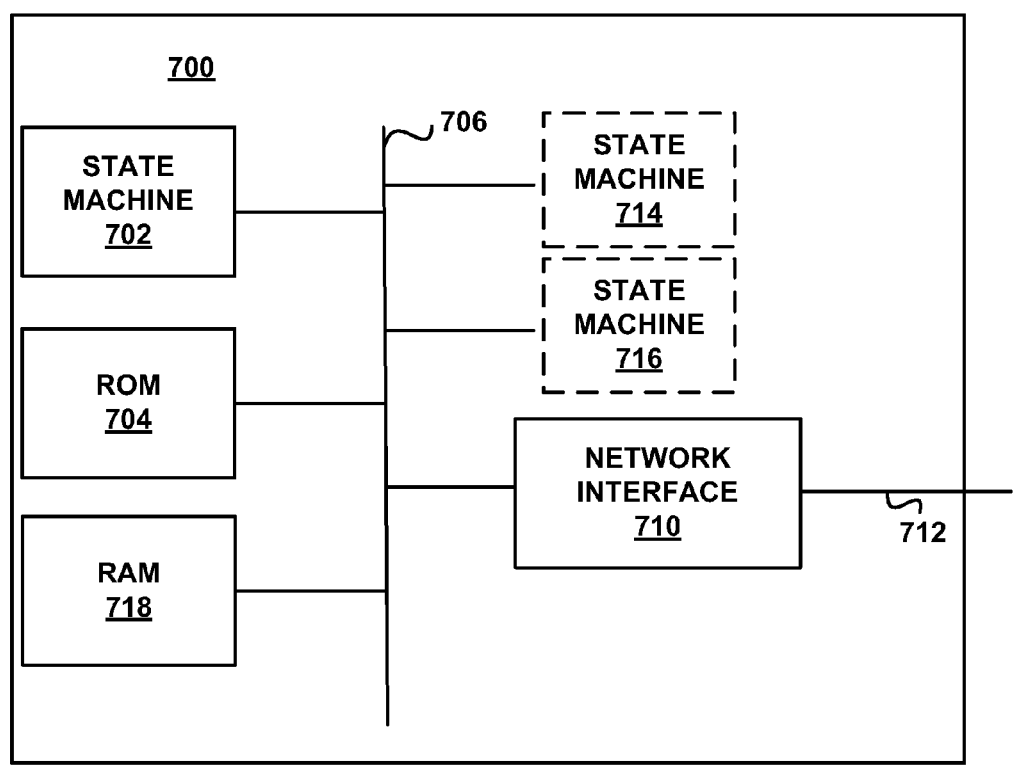
FIG. 7 illustrates an exemplary computing device according to various embodiments.

FIG. 7 illustrates a computing device 700 according to various embodiments. The computing device 700 comprises a state machine 702, a read only memory (ROM) 704, a random access memory (RAM) 718, a network interface 710, and optionally, additional state machines such as 714 and 716, which are all coupled to a system bus 706. Like state machine 260 (FIG. 2), state machine 702 is configured to execute executable instructions in a state machine manner. When no tasks need to be done, the state machine 702 is idle.

The network interface 710 may be any device that may receive data from a network or provide data to the system bus 706. The network interface 710 may be coupled to any digital device via the link 712. The network interface 710 may include, but is not limited to, a hardware or software Ethernet interface/controller, a wireless interface (e.g., 802.11, ZigBee, or Bluetooth). It will be apparent to those skilled in the art that the network interface 710 can support many wired and wireless standards.

Examples of the state machines 714 and 716 is provided in FIG. 4A where state machines 430 and 440 operate along with the TCP/IP stack state machine 410. The state machines 714 and 716, like state machines 430 and 440, may be targeted to handle specific low level tasks, e.g., for listening to ports, etc. A state machine manager component may be included to tie the various state machines together.

Some of the above-described functions can be composed of instructions that are stored on storage media (e.g., computer-readable medium). The instructions may be retrieved and executed for the state machine 702. Some examples of storage media are memory devices, tapes, disks, integrated circuits, and servers. The instructions are operational when executed by the state machine 702 to direct the state machine 702 to operate in accord with various embodiments of the invention. Those skilled in the art are familiar with instructions, processor(s), and storage media.

Figure 8:
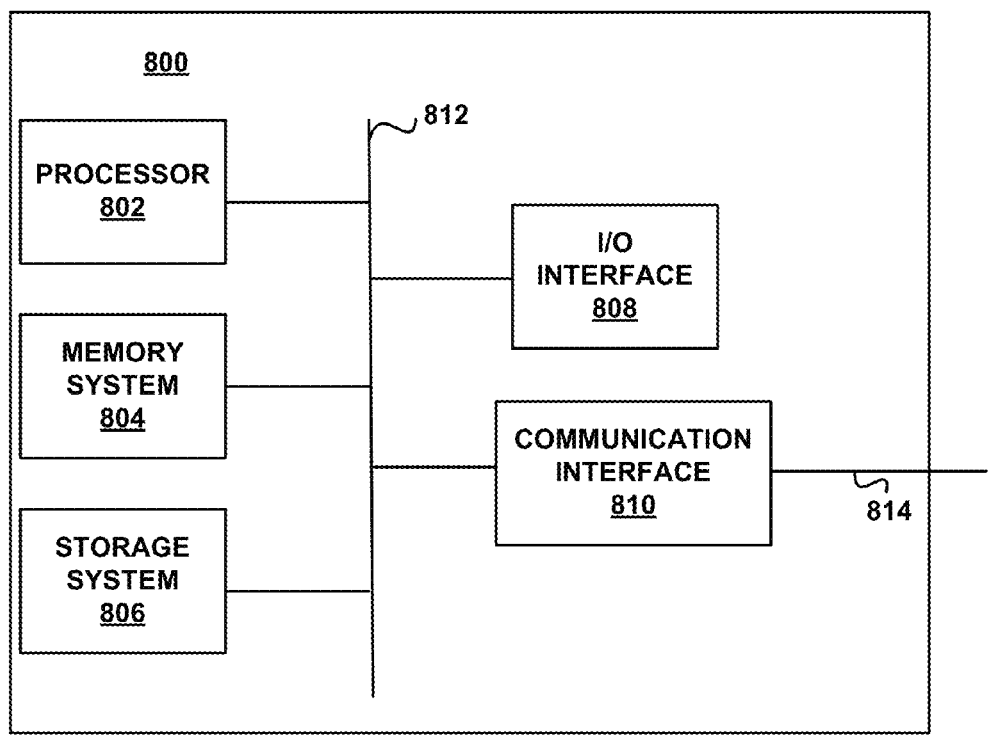
FIG. 8 depicts an exemplary computing device or time server that may communicate with a system in an exemplary computing environment, in some embodiments.

FIG. 8 depicts an exemplary computing device 800 that may communicate with the system in an exemplary computing environment, in some embodiments. The time server 130 in FIG. 1 may be implemented as computing device 800. Device 120 in FIG. 1 may be implemented as device 700 in FIG. 7 or device 800 in FIG. 8 depending on the particular desired environment. The computing device 800 comprises a processor 802, a memory system 804, a storage system 806, an input/output (I/O) interface 808, and a communication interface 810, which are all coupled to a system bus 812. Processor 802 is configured to execute executable instructions. In some embodiments, the processor 802 comprises circuitry or any processor capable of processing the executable instructions.

The memory system 804 is any memory configured to store data. Some examples of the memory system 804 are storage devices, such as RAM or ROM. The storage system 806 is any storage configured to retrieve and store data. Some examples of the storage system 806 are flash drives, hard drives, optical drives, and/or magnetic tape. The storage system 806 may comprise a data structure configured to hold and organize data.

The I/O interface 808 is any device that may receive data from a client or provide data to the client. The I/O interface 808 may include, but is not limited to, a keyboard, a monitor, a mouse, a speaker, a microphone, or a camera.

The communication interface 810 may be coupled to any digital device via the link 814. The communication interface 810 may support communication over a Universal Serial Bus (USB) connection, a firewire connection, an Ethernet connection, a serial connection, a parallel connection, or an Advanced Technology Attachment (ATA) connection. The communication interface 810 may also support wireless communication (e.g., 802.11 a/b/g/n or wireless USB). It will be apparent to those skilled in the art that the communication interface 810 can support many wired and wireless standards.

Some of the above-described functions can be composed of instructions that are stored on storage media (e.g., computer-readable medium). The instructions may be retrieved and executed by the processor 802. Some examples of storage media are memory devices, tapes, disks, integrated circuits, and servers. The instructions are operational when executed by the processor 802 to direct the processor 802 to operate in accord with the invention. Those skilled in the art are familiar with instructions, processor(s), and storage media.

Conventional operating systems manage internal tasks and external programs in a dictatorial manner, by preemptively multitasking through threads and processes. Such a system is flexible and general purpose in nature. However, it may not be optimal since applications and unknown driver components have little or no control over their scheduling.

In contrast to conventional operating systems, the operating system according to the various embodiments of the system regards the whole environment as being inherently cooperative and friendly. To that end, the whole system is essentially a giant state machine. There is no executive, just a cooperative state machine model. All systems and applications components are built together in an open and symbiotic relationship. Only components actually required in a target system are built into the environment. For instance, one would not generally find the game solitaire on a server implementing embodiments of the present invention, as with some network operating systems.

Running a state machine would not be like the method of running time slices in a conventional pre-emptive system, which is a very wasteful method. Some of the various advantages provided by the state machine according to various embodiments are illustrated by an example of putting together an internet server system which has the simple task of running a web server.

In a conventional operating system, the kernel and other systems components would comprise all the normal functions of file and memory management, timers, input and output, TCP/IP, etc. A web server would sit on top of the TCP/IP stack which is itself sitting on top of the core operating system stacks and drivers. In operation, the web server would open a port on a socket on an IP address (e.g. port 80) and listen( ) on that. There would be numerous threads and processes going on in the background, as the kernel executive cycles (usually somewhat uselessly) around all the running processes, updating clocks, checking communication ports, updating displays, checking on Ethernet traffic, and so forth. In this way, the conventional operating system provides a highly sophisticated and flexible system, but with the downside of a tremendous number of activities (and hence clock cycles and therefore energy) going on all the time, just to run perhaps a simple web server.

In contrast, an implementation for this example according to various embodiments of the system may include only the required components (e.g., web server implementation further described with respect to FIG. 5). As a result, execution times and minimal code size would be optimized, resulting in fewer energy cycles. Such a simple web server has just the state machine running handling the lower operation of receiving Ethernet packets up through the TCP/IP stack and responding to HTTP requests. When no tasks need to be done, the state machine is idle. In essence, the system hardware is therefore designed for the good of the software, and the software is designed for the good of the hardware.

One of the drawbacks of conventional general purpose microprocessors is that opcodes are predefined and static. Specifically, common opcodes are allocated to single byte instructions, whereas less common, but perhaps more powerful opcodes, are allocated to multiple byte opcode structures. This conventional approach provides flexibility, but is not optimized. In contrast, a system builder according to various embodiments of the present invention may dynamically profile the code and build an optimal opcode set for the microcode depending on the style of the programmer, in order to minimize various required parameters, such as energy cycles, code size, or a combination thereof. A library for the pre-planned code segments may also be provided to minimize overhead for the code.

The system may also attempt to identify what sub-processes in a larger process system need to be executed sequentially and which sub-processes might be executable in parallel. The system may provide a simple state machine model of a small number of cooperative elements. For more complex systems, a State Machine Manager (SMM) may be provided to regulate and control the run flow. In operation, applications register priority and execution parameter requests with the SMM, which in turn handles them accordingly in a fair manner.

As described above, the CPU is not designed to be general purpose. To that end, the more arcane commands and gates that apply to a vast majority of applications are simply removed. The design philosophy in regards to the opcode instruction set is to design the operating system software first, then optimize the operating system for building in silicon. To that end, the system reuses as many pieces of microcode pertaining to opcodes and opcode snippets as possible.

In the conventional paradigm, the CPU is designed first and thereafter an operating system is designed to run on the CPU. As a result, the operating system design is limited by compromises dictated by the CPU chip design. The applications are then designed to run on the operating system. The design of the applications is limited by all the limitations dictated by the particular operating system design.

In contrast to this conventional design paradigm, the present embodiments begin with the operating system design. Any unnecessary aspects are removed for the design. The CPU chip layout may then be designed. The design process may be iterated to make still further reductions down to the essential components. A program builder, which essentially assembles (or may compile) and links and binds, essentially compiles the mask for the microcode of the microprocessor.

Various embodiments of the system include a core CPU chip with the operating system embedded, and may also include different flavors of adjacent 'personality' chips which are programmable with the high-level application development translation utility. For example, the basic system according to some embodiments may include just a core CPU having the operating system embedded and an IEEE 802.11 Ethernet controller, but with no display or keyboard drivers. In some embodiments, various elements are added to the basic system individually or in combination including micro web servers and browsers, SNMP agents, email servers and clients, SMS servers and clients, etc. Other elements that may be included in a system individually or in combination include power supplies (direct and indirect), and other connectivity options, such as ZigBee or Bluetooth wireless capability, etc. The design and build process for various embodiments of the system are targeted for reducing gate count, maximizing cycle usage, and substantially reducing energy use.

In conventional systems, instruction pointers are only incremented after a "program fetch," when the microprocessor reads the next instruction from memory. According to another aspect of the present invention, an instruction pointer register in the microprocessor may be decremented as well as incremented. A string of opcodes may then be executed forwards or backwards, i.e., providing executable code capability. As a result, code may be reused to save space by running some code backwards.

In conventional systems, a code byte is read from the instruction pointer address and executed, or another byte is read depending on the opcode, etc. The instruction pointer may be revectored automatically by, for example, executing a JUMP instruction. According to another embodiment of the present invention, the instruction pointer may be revectored by a higher-level instruction pointer manager in the core CPU microcode. That is, the CPU design provides that a higher-level instruction pointer manager can force a jump in the instruction pointer to execute preferable code. This revectoring provides a different mechanism over and above a standard software or hardware interrupt controller.

Depending on the particular hardware design implementation, binary '1's or '0's may take more or less power to support. According to another aspect, an optimizing code generator may dynamically analyze the opcode and data binary structures and switch accordingly to the most energy efficient implementation of binary 1's and 0's. In other words, the microprocessor design mask may be optimized for binary 1's and 0's, depending on whether a majority of 1's or 0's may produce a lower overall power consumption.

According to various embodiments, the system and operating system code executes in ROM. The ROM-execution, execution as a state machine, and the saving of register contents during deep sleep provide an "instant-on" capability where it may take just milliseconds for the system to resume execution. RAM memory may be used for only truly read-write data that requires it. The execute-only code needs only to be in ROM. The slower access times of ROM devices versus RAM devices are not an issue because the instruction cycle times for the system are generally slow, albeit for a reduced number of cycles.

According to another aspect, the system eliminates wasted internal clock cycles through the use of intelligent tasking, in contrast to multi-tasking. The intelligent tasking may include having pre-plan code nests in the CPU, so that different steps of different code streams can execute in the 'gaps' inevitably left in their processes. For example, for a code stream a and code stream b as follows:

Code Stream a:
DO . . . WAIT . . . WAIT . . . WAIT . . . WAIT . . . DO . . . DO . . . WAIT . . . WAIT . . . WAIT . . . DO Code Stream b:
WAIT . . . WAIT . . . DO . . . DO . . . DO . . . WAIT . . . WAIT . . . WAIT . . . DO . . . WAIT . . . WAIT The intelligent tasking interleave these code streams intelligently to greatly reduce the inefficient wait cycles as follows: DO . . . WAIT . . . DO . . . DO . . . DO . . . DO . . . DO . . . WAIT . . . DO . . . WAIT . . . DO The ultra-low energy and size reduction provided by the system according to the present invention may make it feasible to include embedded Internet capability in a whole range of devices that would otherwise lack it due to the conventional micro-controllers being too big and consuming too much power. The system may reduce power consumption from Watts to microWatts, or perhaps even to nanoWatts. For example, some light bulbs and switches may be Internet-enabled for the first time using embodiments of the system.

Turning to further details regarding the software implementation, the operating system software may be completely developed in native assembler. The fundamentally overriding requirement for the system is to aim for the utmost performance, in everything from code size, ROM-execution, reversible code, clock (energy) cycle counting, and so forth. The system has no conventional requirement for "easy portability", which would normally point to a 'C' or C++ based implementation that can be easily ported. In contrast, porting the system to a new microprocessor entails recoding the assembler implementation for a new microprocessor, a straight-forward task for those skilled in the art.

The system may implement, at the lowest level of security, SSL, i.e., HTTPS for web browsing. At a higher level, S-HTTP may be implemented for web browsing. The system may also implement a lightweight real time streaming protocol ("LDF"). This protocol may be used for data as well as "command and control." Data packets may be easily encrypted at several levels from easy-low to secure-high, e.g., private/public key encryption.

The system may include ultra low power microprocessors, tiny embedded Internet operating systems, and associated software products, such as Software Development Kits (SDKs) to enable third parties to develop applications, and application suites for managing devices. Various application areas for the system include, but are not limited to, clean tech (green energy), medical, military, aerospace, automotive, Smartphone, Personal Digital Assistant (PDA), Pocket Computer, and so forth. In the clean tech area, for example, one application for the system of the present invention may be "a tiny Internet chip in every light bulb." Such a chip-in-a-light bulb could, for instance, be wired directly from an available "free" 240V or 110V AC voltage supply, utilizing N-type Metal Oxide Semiconductor (NMOS) for providing "super-strong" high voltage and very low current consumption chips. In some embodiments, an inductor may be used to generate isolated low voltage from the power line AC cycles. The network traffic may be transmitted over the power line. One of the advantages of the present system for a chip-in-a-light bulb application is that low data rates can be used to handle the anticipated light data traffic.

Electrical devices in a house or office, such as light bulbs, switches and plugs which use the present system, could be carefully monitored and controlled from a smart meter or desktop web browser. The devices may have the present system implement a micro web server embedded for command and control. A web browser or SNMP management program could display all such devices in a local smart grid, monitor them, turn them on and off, reduce power, schedule the device to run at the most efficient and economical time (e.g., a dishwasher) etc.

Exemplary medical applications include use of the present system for stents. A stent is a synthetic tube inserted into a natural passage/conduit in the body to prevent, or counteract, a disease-induced, localized flow constriction. A tiny chip implementing an embodiment of the present system could be built into each stent along with a tiny ultra long life and low power RF transmitter/receiver. The modified stent could send data about the state of the artery in realtime over the wireless Internet, such that a patient's condition can be monitored live, perhaps 24 hours a day.

The present system could also be used for other medical patient monitoring applications where the small size, low power and Internet monitoring aspects would provide enormous benefits, e.g., use in a "digital plaster" stuck to a patient's body to track vital signs (such as heart rate and breathing) and then send alerts to doctors over the Internet.

The present system may provide ultra low power Internet operating system and microprocessor products for use in many other product areas, such as military, aerospace, and automotive, as well as next-generation Smartphones, PDAs, Pocket Computers. Currently unknown new classes of applications may be made possible by the present system. Other exemplary applications include low power devices needed for unmanned and manned missions to other planets and new network architectures for motor vehicles.

The ultra low power aspect of the present system may provide greatly improved battery life for various devices. Boot up time for devices may be greatly reduced by executing instructions from ROM, saving general state information in battery-backed SRAM, and saving crucial microprocessor register setting and other state information saved in special registers in custom ASICs, for example.

Chips implementing the present system may communicate over various means including but not limited to: standard twisted pair Ethernet, coax, ZigBee, Bluetooth, Low Power Bluetooth, and perhaps wireless Ethernet. A server embedded in the dongle of a twisted pair Ethernet connector could be one of the countless potential applications for the present system The system may include software development tools for the operating system and the microprocessor chip design, e.g. assembler, linker, BIN-to-ROM tools, debugger, etc.

A full Internet Protocol stack typically includes an application layer, transport layer, internet layer, and link layer. The basic operating system for the present system may not normally have all the components of a full Internet Protocol stack. A basic kernel may have for example just HTTP on top of TCP on top of IP on top of Ethernet. Alternatively, the kernel may be built with SNMP on UDP on IP on Ethernet.

Conventionally, TCP/IP is not an operating system, but a communications stack, typically using a Berkeley Sockets (or WinSock) style API. A simple sequence for a web server for Windows would include: 1. Initialize Winsock; 2. Create a socket; 3. Bind the socket; 4. Listen on the socket for a client; 5. Accept a connection from a client; 6. Receive and send data; and 7. Disconnect.

According to various embodiments, the operating system API for the system is uniquely, purely Sockets-based. Since it is also Assembler-based, the normal 'C' based Sockets APIs are replaced with custom register-based analogies. Parameter passing of other programming languages may be replaced by microprocessor register passing.

The operating system kernel is built per application to include only the necessary APIs. The kernel also may provide a configurable set of built-in device drivers and application modules. The built-in device drivers may include, for example, drivers for console display, graphics display, html, xml, keyboard, mouse, serial port, USB port, and Ethernet. Other built-in and API application functions may include SMS, email, Twitter, Facebook, MySpace, Call, and Search (e.g., Google, Bing).

For applications such as clean tech, such as smart light bulbs and switches, a new protocol at the low level of the Internet Control Message Protocol (ICMP) may be devised to poll and control smart devices. Such a protocol lies a little above the IP layer, but well below protocols such as UDP or TCP. There is not necessarily the need to have the overhead of a full TCP implementation or a conventional SNMP module. Advantages of the new protocol include a smaller kernel, and a communications protocol optimized to the particular requirements.

Alternatively, SNMP and a web server may be used (see FIG. 4A as described above). This would be akin to the way it has long been possible to control a router or printer over the internet, by connecting to the URL or IP address of the device. With the present system, this would be possible for any device, no matter how small or cheap.

Microprocessor opcode may be optimized for implementations. A minimal opcode set may form the basis of the operating system/CPU instruction set. Many x86 opcodes, for example, may basically not be used at all in an optimal implementation of a highly Internet-centric system of the present invention. Such extraneous opcodes waste transistors in a CPU and therefore are not included in the minimal set. Conversely, there are some operations which are often used in an internet software implementation, such as Internet Checksum calculations, IP address parsing, CRC number generation, and packet deconstruction which could be optimized even as single opcodes.

The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system ROM (or RAM), from which a CPU retrieves and executes the instructions. The instructions received by system ROM (or RAM) can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method comprising: receiving, by an operating system embedded within and executing within a central processing unit (CPU), input/output (I/O) requests, the operating system comprising an operating system kernel based on a network protocol stack for processing the I/O requests according to at least one network protocol, wherein processing of all I/O requests utilizes a sockets style application programming interface (API), and wherein the network protocol stack comprises a Transmission Control Protocol/Internet Protocol (TCP/IP) stack such that the operating system consists of a TCP/IP stack state machine.

2. The method of claim 1, wherein processing the I/O requests comprises communicating data via a network interface, the network interface comprising one of an Ethernet controller and a wireless interface.

3. The method of claim 1, wherein executable instructions for the operating system are stored in memory of the CPU and executed through the sockets style application programming interface (API).

4. The method of claim 3, further comprising accessing via the sockets style API one or more of a keyboard input device and a display output device.

5. A computing system comprising: a central processing unit (CPU) comprising an operating system (OS) embedded therein, the operating system comprising an operating system kernel based on a network protocol stack that processes I/O requests according to at least one network protocol, wherein processing of all I/O requests utilizes a sockets style application programming interface (API), and wherein the network protocol stack comprises a Transmission Control Protocol/Internet Protocol (TCP/IP) stack such that the operating system consists of a TCP/IP stack state machine.

6. The computing system of claim 5, further comprising a network interface that further comprises one of an Ethernet controller and a wireless interface.

7. The computing system of claim 5, wherein executable instructions for the operating system are embedded within the CPU and execute through the sockets style application programming interface (API).

8. The computing system of claim 5, wherein executable instructions for the operating system are stored solely in read only memory (ROM).

9. The computing system of claim 5, further comprising an asynchronous clock to serve as an internal clock for the operating system.

10. The computing system of claim 9, wherein the asynchronous clock is configurable to automatically stop when clock cycles are not needed.

11. The computing system of claim 5, wherein a time reference for the operating system kernel is based on a Simple Network Time Protocol (SNTP) from a remote time server coupled to a network, which is communicatively coupled with the computing system.

12. The computing system of claim 11, wherein the network further comprises the Internet.

13. The computing system of claim 5, wherein instructions for the operating system, executable by the central processing unit and stored in read only memory, are written in assembly language.

14. A chip comprising:
a central processing unit (CPU); and
an operating system embedded in the CPU, the operating system comprising an operating system kernel based on a network protocol stack for processing input/output (I/O) requests, wherein processing of all I/O requests utilizes a sockets style application programming interface (API), and wherein the network protocol stack comprises a Transmission Control Protocol/Internet Protocol (TCP/IP) stack such that the operating system consists of a TCP/IP stack state machine.

15. The chip of claim 14, wherein executable instructions for the operating system are stored solely in and execute solely from read only memory (ROM) and execute through the sockets style application programming interface (API).

16. The chip of claim 14, further comprising an asynchronous clock to serve as an internal clock for the operating system kernel.

17. A non-transitory computer-readable storage media having embodied thereon an operating system, the operating system executable by a processor to handle input/output (I/O) requests, the operating system consisting of: an operating system kernel that consists of: a sockets layer, a transmission control protocol (TCP) layer, an Internet Protocol (IP) layer, and a driver layer, the operating system kernel handling I/O requests between at least one application and at least one hardware resource of a computing device; wherein processing of all I/O requests utilizes a sockets style application programming interface (API).

18. The storage media of claim 17, wherein the non-transitory computer-readable storage media comprises a ROM of a computing device.

19. The storage media of claim 17, wherein the at least one application is executed on an additional computing device that is located remotely from the computing device that comprises the at least one hardware resource.

20. The storage media of claim 17, wherein the operating system kernel binds the at least one hardware resource to an open socket of the sockets layer.

* * * * *